United States Patent [19]

Allen

[11] 4,312,376
[45] Jan. 26, 1982

[54] PRESSURE-SUSTAINING VALVE

[75] Inventor: Walter E. Allen, Prospect, Conn.

[73] Assignee: Transamerica DeLaval Inc., Princeton, N.J.

[21] Appl. No.: 152,544

[22] Filed: May 23, 1980

[51] Int. Cl.³ ............................................. F16K 15/06
[52] U.S. Cl. ................................. 137/494; 137/536; 137/540; 251/282
[58] Field of Search ............... 137/494, 536, 540, 542; 251/282

[56] References Cited

U.S. PATENT DOCUMENTS

| | | | |
|---|---|---|---|
| 1,998,056 | 4/1935 | Naatz | 251/281 X |
| 2,230,718 | 2/1941 | Gannestad | 251/282 X |
| 2,326,462 | 8/1943 | Johnson | 137/494 |
| 2,499,527 | 3/1950 | Raymond | 137/494 |
| 3,756,558 | 9/1973 | Okui | 251/282 |

*Primary Examiner*—Robert G. Nilson

*Attorney, Agent, or Firm*—Hopgood, Calimafde, Kalil, Blaustein & Judlowe

[57] ABSTRACT

The invention contemplates a valve having particular application to the control of flow and pressure within a sanitary-sewer system which includes independently pumped feeders at elevations below an intervening region of greater elevation. The valve, located at the downstream side of the region, of greater elevation, and below the elevation of pumping on the upstream side of the region of greater elevation, provides (a) such a minimum level of pressure at its inlet as to assure against syphoning liquid sewage out of the greater-elevation region, (b) a reduction in hydraulic-head pressure for liquid sewage passed by the valve to the succeeding downstream region of lower elevation, and (c) such balanced response to excessive downstream-region pressure development as to prevent any development of upstream flow through the valve, i.e., such balanced response as to prevent changes in upstream pressure level with fluctuating downstream pressure level.

10 Claims, 2 Drawing Figures

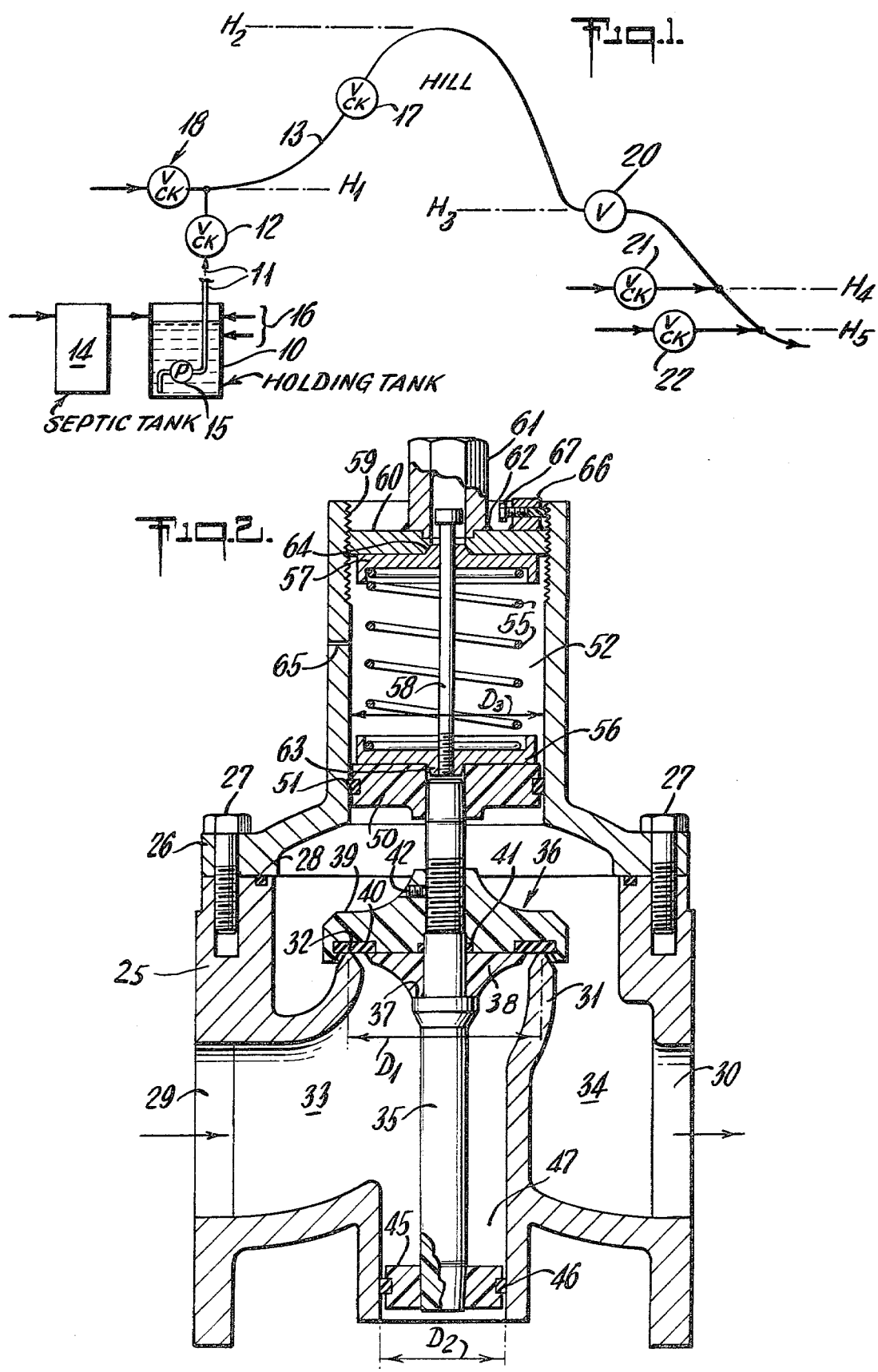

PRESSURE-SUSTAINING VALVE

BACKGROUND OF THE INVENTION

The invention relates to a valve having particular application to the control of flow and pressure within a sanitary-sewer system.

Sanitary-sewer systems which operate in hilly terrain may include independently pumped feeders at elevations which are below an intervening region of greater elevation. For example, one or more septic-tank sources may discharge into a holding tank from which liquid-sewage is pumped into a feeder to the sewer line which runs up over a hill to serve one or more such feeders on the other side of the hill. It is customary to use one or more check valves to protect against back flow in that part of the sewer line (and its feeders) which climbs the hill in the downstream direction of liquid-sewage flow. And on the downslope after climbing the hill, it is customary to employ one or more relatively cumbersome relief valves (sometimes called pressure-sustaining valves) to assure against syphoning liquid sewage out of the greater-elevation region, as well as to assure against presentation of an excessive hydraulic head to septic-tank discharges into the sewer line below the relief-valve location. Each relief valve requires extreme care in establishing a solid local foundation from which a guide-axis of the valve can be fixed and assuredly vertical; heavy-weight elements are applied to the valve on the guide axis to preload the relief function to a level which will hopefully avoid syphoning. However, as a practical matter, the necessary field preparation of the local foundation by careless personnel often results in a guide axis that is not vertical, so that friction of the weight elements with respect to the guide axis becomes a serious factor in development of mechanical hysteresis in valve action; furthermore, there is a great inherent lack of precision involved in the preloading increments associated with use of such weight elements.

BRIEF STATEMENT OF THE INVENTION

It is an object of the invention to provide an improved valve construction of the character indicated.

It is a specific object to provide such a valve which does not require a critical foundation orientation and which lends itself to precision preloading appropriate to the situs of valve installation.

Another specific object is to provide such a valve with an inherent incapability of opening in the presence of excessive downstream pressure.

A general object is to achieve the above objects with a basically simple, reliable, readily adjustable, serviceable and low-cost construction.

The invention achieves the foregoing and other objects and features in a valve wherein valve action involves a stem-mounted valve member which opens and closes with respect to the downstream side of a fixed circular seat, the stem and valve member being guided coaxially with the seat and on an axis normal to the plane of the seat, and being also adjustably preloaded in the valve-closing direction. The guidance of at least the downstream end of the valve stem involves a fluid-pressure responsive suspension of effective area matching that of the valve seat. In this circumstance, liquid pressure at inlet to the valve, in the closed condition of the valve, is maintained until achievement of a threshold pressure, based on the preload adjustment, whereupon the valve is self-opening for downstream discharge. On the other hand, in the unlikely event of downstream pressure development in excess of the indicated threshold pressure, the seat-area match to the guide-suspension area means that there will be no net force development on the valve and thus no tendency to open the valve to backward flow.

DETAILED DESCRIPTION

The invention will be described in detail for a preferred form, in conjunction with the accompanying drawings, in which:

FIG. 1 is a simplified diagram to illustrate terrain circumstances of a sanitary-sewer system in which a valve of the invention is installed; and FIG. 2 is an enlarged vertical sectional view of a valve of the invention, of the type used in the system of FIG. 1.

In the simplified terrain layout of FIG. 1, a holding tank 10 is one of a plurality of liquid-sewage sources connected by its feeder 11 and associated check vlave 12 to a sanitary-sewer line 13. Tank 10 illustratively receives liquid discharge from a septic tank 14 and includes a submerged pump 15 under automatic control to maintain the holding-tank level between upper and lower switching limits, symbolized by arrows 16. The connection of line 11 is effectively the elevation of tank 10 and to the sewer line 13 is at a first elevation $H_1$ which is below the maximum elevation $H_2$ of a hill which must be traversed by downstream flow of liquid sewage, and in the climb to elevation $H_2$ one or more check valves 17 may be included to prevent backflow. The holding tank 10 and its pump may be one of several served by the upslope end of sewer line 13, another such source being symbolized at 18.

On the downslope side of the hill served by sewer line 13, a valve 20 of the invention is provided at an elevation $H_3$ lower than elevation $H_1$ and above the elevations $H_4$–$H_5$ of two further sources 21–22 which discharge into line 13, for further downstream-directed flow. The sources 21–22 may each be as described in connection with tank 10.

Referring now to FIG. 2, the valve 20 of the invention will be seen to comprise a main body 25 with a bonnet 26 removably secured thereto by bolts 27, a sealed fit being assured by an elastomeric O-ring 28. The main body 25 has an inlet port 29 and an outlet port 30 with interposed bridge structure 31 which provides a circular open seat 32 of an effective diameter $D_1$; the interior body space between ports 29–30 is thus divided between an inlet chamber 33 and an outlet chamber 34. And preferably, the inlet-chamber wall is contoured with a smoothly rounded upsweep to the seat opening, as shown.

The fit of bonnet 26 to main body 25 is at circular annular surfaces which are centered on the axis of a stem 35 and associated valve member 36. Stem 35 is normal to the plane of the circle of seat 32 and extends concentrically therethrough, being concentrically stabilized and guided at its ends, by inlet-chamber guide means and by outlet-chamber guide means to be described. As shown, valve stem 35 accommodates a multiple-element valve member 36, against a shoulder 37, the parts being a base or hub 38, a cap 39 having a threaded bore, an annular elastomeric ring or washer 40 seated in a recess in cap 39 and poised to develop valve-closing engagement with seat 32, and an elastomeric O-ring seal 41. When threaded to stem 35, cap 39 and hub 38 positively locate and retain the seat washer 40, and a set screw 42 in cap 39 is locally driven into stem 35 to hold the valve-member and stem assembly.

The inlet-chamber guide means for stem 35 is shown as a piston 45 fitted to the lower end of stem 35 and having a circumferential groove for an elastomeric seal ring 46; ring 46 has circumferentially sealed engagement with the bore of a cylindrical guide formation 47, being an integral part of main body 25. The guide 47 is concentric with the valvestem axis and would provide external access to the inlet chamber 33, were it not for the piston and seal means 45-46. The effective diameter $D_2$ of the inlet-chamber guide means is substantially less than the effective seat diameter $D_1$.

The outlet-chamber guide means for stem 35 is shown as a second piston 50 fitted to the upper end of stem 35 and having a circumferential groove for an elastomeric seal ring 51; ring 51 has circumferentially sealed engagement with the bore of a cylindrical guide formation 52, being an integral part of the bonnet 26. The guide 52 is concentric with the valvestem axis and would provide external access to the outlet chamber 34, were it not for the piston and seal means 50-51. And the effective diameter $D_3$ of the outlet-chamber guide means is preferably the same as the effective seat diameter $D_1$, thus assuring that no downstream pressure development will ever impart a net displacement force upon the valve stem 35 and its associated valve member 36.

Materials for the parts thus far described are metal castings for the valve-body parts 25-26, and suitable plastic such as Nylon, ABS, PVC, polypropylene, or the like, for valve stem 35 and its associated piston and valve-member components 45-50 and 38-39. Each piston has a solvent-bonded taper fit to an end of stem 35, and hub 38 is preferably solvent-bonded to shoulder 37. The valve-member washer 40 is suitably of 70-durometer rubber.

The upstanding bonnet formation which establishes the cylindrical guide bore 52 is preferably sufficiently elongate to contain and protect a preloading coil spring 55. As shown, spring 55 is a component of a preloaded subassembly comprising end-seat plates 56-57 and a headed retaining bolt 58. The shank end of bolt 58 has threaded engagement to the center of lower plate 56, and at its head end the shank of bolt 58 is slidable in a central bore of the upper plate 57. The length of bolt 58 is such as to establish an initial preload of spring 55, at a preload level less than ultimately required for valve operation. Nevertheless, as a preloaded subassembly, the overall axial span between plates 56-57 is sufficiently less than the length of the bonnet guide portion 52 that, for the valve-closed position, the spring preassembly may be fully received within bore 52, leaving sufficient access to the threaded end 59 of bore 52 for engagement by a threaded preloading plug or disc 60. As shown, disc 60 is centrally apertured and fitted with a hexagonal cap 61, to define an extended internal passage for clearance reception of the head of bolt 58; parts 60-61 are preferably of steel and are welded together, as suggested at 62. Short axially extending central hub formations 63-64 on the seat plates 56-57 assure centering location at the piston 50 and at the preloading disc 60, respectively, and one or more bleed ports 65 in the bonnet extension assure external-air access at all times to the outer side of piston 50. Finally, a lug 66 welded to disc 60 carries set-screw means 67 by which a given preloading adjustment of disc 60 may be retained.

In use, as at the location 20 in FIG. 1, the described valve structure is seen to achieve all stated objects. Preload adjustment is readily made via the hexagonal access 61 and retained at 67. Set pressure remains constant and independent of variations in downstream pressure level. Operation is independent of valve orientation and, therefore, no precision mounting orientation is needed. The internal parts are readily accessible for servicing and replacement, via disc 60 in the case of the preloading-spring assembly, and via bonnet removal in the case of the valve stem and member assembly.

While the invention has been described in detail for the preferred form shown, it will be understood that modifications may be made without departure from the scope of the invention.

What is claimed is:

1. A piston-valve construction, comprising a valve body with a passage communicating between inlet and outlet ports, an interior bridge dividing the space between said ports into an inlet chamber and an outlet chamber, said bridge having an opening defining a circular valve-member seat of first effective diameter, an elongate valve stem extending normal to the circle of said seat and centrally therethrough, a valve member carried by said stem and positionable to open or close the valve in accordance with stem-guided displacement with respect to said seat, a first piston on that end of said stem which extends into said inlet chamber, first cylindrical guide means carried by said body for said first piston and extending coaxially with the stem axis, a second piston on that end of said stem which extends into said outlet chamber, second cylindrical guide means carried by said body for said second piston and extending coaxially with the stem axis, seal means associated with each piston for sealing the same against fluid flow from the associated one of said chambers, the sealed area of said first piston being less than the effective area of said seat and the sealed area of said second piston being substantially the same as the effective area of said seat, and stem-loading means continuously urging said valve member in the direction of seat engagement.

2. The construction of claim 1, in which said stem-loading means includes selectively adjustable means for varying the magnitude of loading.

3. The construction of claim 1, in which each of said pistons has a circumferentially continuous groove, and in which said seal means is in each case an elastomeric ring seated in the associated groove and in continuous sliding contact with the adjacent cylindrical guide means.

4. The construction of claim 1, in which said first cylindrical guide means comprises a cylindrical port formation in said body, said first piston and its seal means effectively closing said inlet chamber from air access to the exterior of said body via said port formation.

5. The construction of claim 1, in which said body includes a removable closure bonnet on the downstream side of and concentric with said seat, said bonnet spanning an area larger than that of said valve member, and said second cylindrical guide means being a part of said bonnet, said second piston and its seal means effectively closing said outlet chamber from air access to the exterior of said body via said second cylindrical guide means.

6. The construction of claim 1, in which said second cylindrical guide means is elongate and tubular and has an internally threaded outer end, said stem-loading means including a threaded disc engaged to said threaded outer end, and a coil spring compressed between said disc and said second piston.

7. The construction of claim 6, in which said coil spring is part of a partially preloaded preassembly comprising first and second seat plates for the respective ends of said spring, a headed bolt having a shank slidable through a central opening in one of said seat plates and having threaded-end engagement with a central opening of the other of said plates; the partially preloaded overall axial extent between seat plates of said preassembly being such that with said valve member in seated position and with said other plate abutting said second piston, said threaded disc may be engaged to the threaded outer end of said second cylindrical guide means, said threaded disc having a central opening in clearance with the headed end of said bolt.

8. A valve construction, comprising a valve body with a passage communicating between inlet and outlet ports, an interior bridge dividing the space between said ports into an inlet chamber and an outlet chamber, said bridge having an opening defining a circular valve-member seat of first effective diameter, an elongate valve stem on an axis extending normal to the circle of said seat and centrally therethrough, a valve member carried by said stem on the downstream side of said seat and positionable to open or close the valve in accordance with stem-guided displacement with respect to said seat; first guide means coacting with the inlet-chamber end of said stem and with a body portion of the inlet chamber to retain said inlet-chamber end on said axis through a range of valve-stem displacement, said first guide means including fluid-pressure-responsive means exposed on one side to fluid within the inlet chamber and on its other side to fluid external to said body, said first guide means being of effective area less than that of said seat; second guide means coacting with the outlet-chamber end of said stem and with a body portion of the outlet chamber to retain said outlet-chamber end on said axis through a range of valve-stem displacement, said second guide means including fluid-pressure-responsive means exposed on one side to fluid within the outlet chamber and on its other side to fluid external to said body, said second guide means being of effective area substantially equal to that of said seat; and stemloading means continuously urging said valve member in the direction of seat engagement.

9. The construction of claim 8, in which each of said guide means comprises a cylinder with sealed piston slidable therein and on said axis.

10. A valve construction, comprising a valve body with a passage communicating between inlet and outlet ports, an interior bridge dividing the space between said ports into an inlet chamber and an outlet chamber, said bridge having an opening defining a circular valve-member seat of first effective diameter, an elongate valve stem on an axis extending normal to the circle of said seat and centrally therethrough, a valve member carried by said stem on the downstream side of said seat and positionable to open or close the valve in accordance with stemguided displacement with respect to said seat; first guide means coacting with the inlet-chamber end of said stem and with a body portion of the inlet chamber to retain said inlet-chamber end on said axis through a range of valve-stem displacement, said first guide means including fluid-pressure responsive means exposed on one side to fluid within said inlet chamber and on its other side to fluid external to said body, said first guide means being of effective area less than that of said seat, second guide means coacting with the outlet-chamber end of said stem and with a body portion of the outlet chamber to retain said outlet-chamber end on said axis through a range of valve-stem displacement, said second guide means including fluid-pressure-responsive means exposed on one side to fluid within the outlet chamber and on its other side to fluid external to said body, said second guide means being of effective area substantially equal to that of said seat; and stem-loading means continuously urging said valve member in the direction of seat engagement.

* * * * *